US006330111B1

(12) United States Patent
Myers

(10) Patent No.: US 6,330,111 B1
(45) Date of Patent: Dec. 11, 2001

(54) LIGHTING ELEMENTS INCLUDING LIGHT EMITTING DIODES, MICROPRISM SHEET, REFLECTOR, AND DIFFUSING AGENT

(75) Inventor: Kenneth J. Myers, Dobbs Ferry, NY (US)

(73) Assignee: Kenneth J. Myers, Edward Greenberg, Irvington, NY (US)

( * ) Notice: Subject to any disclaimer, the term of this patent is extended or adjusted under 35 U.S.C. 154(b) by 0 days.

(21) Appl. No.: 09/640,024

(22) Filed: Aug. 17, 2000

Related U.S. Application Data

(63) Continuation-in-part of application No. 09/592,913, filed on Jun. 13, 2000.

(51) Int. Cl.[7] ................................ G02B 5/02; F21V 7/04

(52) U.S. Cl. ............................ 359/599; 359/707; 362/31

(58) Field of Search .................................... 359/599, 707, 359/831–837; 349/56–71; 362/29, 31, 237, 241, 247, 197; 385/133, 901

(56) References Cited

U.S. PATENT DOCUMENTS

| | | | | |
|---|---|---|---|---|
| 2,881,686 | | 4/1959 | Ruhle | 396/150 |
| 2,909,770 | | 10/1959 | Pugsley | 348/834 |
| 3,279,340 | | 10/1966 | Ramberg et al. | 396/546 |
| 3,718,078 | | 2/1973 | Plummer | 359/459 |
| 3,902,787 | | 9/1975 | Sherlock | 359/453 |
| 3,971,051 | | 7/1976 | Baker et al. | 396/52 |
| 4,165,920 | | 8/1979 | Brown | 359/613 |
| 4,206,969 | | 6/1980 | Cobb et al. | 359/452 |
| 4,214,257 | | 7/1980 | Yamauchi | 348/59 |
| 4,309,073 | | 1/1982 | Nishimura et al. | 359/455 |
| 4,309,074 | | 1/1982 | Granieri, Jr. | 359/428 |
| 4,333,707 | | 6/1982 | West | 359/428 |
| 4,708,435 | | 11/1987 | Yata et al. | 359/456 |
| 4,756,603 | | 7/1988 | Ohtani | 359/601 |
| 4,805,984 | * | 2/1989 | Cobb, Jr. | 385/133 |
| 4,834,495 | * | 5/1989 | Whitehead et al. | 385/133 |
| 4,911,529 | | 3/1990 | Van De Ven | 359/454 |
| 5,143,433 | * | 9/1992 | Farrell | 349/68 |
| 5,208,620 | | 5/1993 | Mitsutake et al. | 353/24 |
| 5,278,545 | * | 1/1994 | Streck | 345/102 |
| 5,316,359 | | 5/1994 | Lansinger | 296/20 |
| 5,317,405 | | 5/1994 | Kuriki et al. | 359/618 |
| 5,359,691 | | 10/1994 | Tai et al. | 385/146 |
| 5,363,237 | | 11/1994 | Wakatake | 359/546 |
| 5,446,594 | | 8/1995 | Nelson et al. | 359/742 |
| 5,475,785 | * | 12/1995 | Johanson | 385/100 |
| 5,512,219 | | 4/1996 | Rowland et al. | 264/1.6 |
| 5,619,373 | | 4/1997 | Meyerhofer et al. | 359/482 |
| 5,671,992 | | 9/1997 | Richards | 353/7 |
| 5,729,387 | | 3/1998 | Takahashi et al. | 359/591 |
| 5,742,411 | | 4/1998 | Walters | 359/2 |
| 5,769,532 | * | 6/1998 | Sasaki | 362/237 |
| 5,835,661 | | 11/1998 | Tai et al. | 385/146 |
| 5,836,096 | | 11/1998 | Brauer | 353/38 |
| 5,837,346 | | 11/1998 | Langille et al. | 428/141 |
| 5,926,601 | | 7/1999 | Tai et al. | 349/64 |
| 5,956,180 | | 9/1999 | Bass et al. | 359/429 |
| 5,973,831 | | 10/1999 | Kleinberger et al. | 359/465 |
| 5,993,004 | | 11/1999 | Moseley et al. | 359/464 |

FOREIGN PATENT DOCUMENTS

| | | | | |
|---|---|---|---|---|
| 5-100223-A | * | 4/1993 | (JP) | 359/599 |

* cited by examiner

*Primary Examiner*—Thong Nguyen
(74) *Attorney, Agent, or Firm*—Bacon & Thomas

(57) ABSTRACT

Lighting elements employing multiple light emitting diodes and a diffusive agent such as a microprism sheet, a gas, or a gel, include a video monitor, a light bulb, a neon tube replacement, and a large area compound light panel. Each of the lighting elements may include light emitting diodes of different colors to provide color lighting effects.

12 Claims, 2 Drawing Sheets

LIGHTING ELEMENTS INCLUDING LIGHT EMITTING DIODES, MICROPRISM SHEET, REFLECTOR, AND DIFFUSING AGENT

This application is a continuation-in-part of U.S. patent application Ser. No. 09/592,913, filed Jun. 13, 2000.

BACKGROUND OF THE INVENTION

1. Field of the Invention

This invention relates to wide-area lighting or display structures made up of a plurality of relatively small discrete light sources such as light emitting diodes (LEDs), corresponding to the lighting elements originally described in U.S. patent application Ser. No. 09/592,913, incorporated herein by reference, and in particular to various modifications and new applications of the lighting elements described in U.S. patent application Ser. No. 09/592,913.

The new applications include adaptation of the lighting elements described in U.S. patent application Ser. No. 09/592,913 to function as a conventional-type or stereoscopic color video monitor, a light bulb, or a flexible neon sign replacement element. In addition, the present patent application discloses various alternative constructions of the lighting element described in U.S. patent application Ser. No. 09/592,913, including combination of smaller elements into larger elements to provide a full color flat lighting, and variations in the manner in which the diffusive agent and reflective structures are arranged, including use of lenticular or reflective diffusers, and microprism sheets with varying light transmission properties as described in copending U.S. patent application Ser. Nos. 09/481,942, 09/538,731, and 09/559,177.

2. Description of Related Art

Light emitting diodes have a number of advantages over conventional lighting elements, including relatively low power consumption, the ability to emit light of different colors, and durability. However, because of the small size of LEDs, they cannot be used to provide wide area lighting or display elements or structures.

In parent application Ser. No. 09/592,913, it was proposed to combine the conventional LEDs into a new type of lighting element in which light from the individual LEDs is diffused through a microprism sheet to provide a lighting effect similar to that provided by a fluorescent light, and yet that is flexible and can therefore be formed into a wide variety of configurations, including tube-shaped structures capable of emulating a fluorescent light tube, without the relatively high power consumption of a conventional fluorescent light tube or the need for an electronic ballast.

The present application utilizes the principles of combining LEDs with diffusers and/or a reflector to provide uniform light emission in the manner of a fluorescent light tube or panel, but extends the concept to (i) the construction of diverse light sources such as flat panel video monitors, light bulbs, and so forth, (ii) the addition of multiple colors where appropriate, (iii) use of different types of diffusive agents, including use of lenticular or reflective diffusers, and microprism sheets with varying light transmission properties as described in the above-cited copending U.S. patent application Ser. Nos. 09/481,942, 09/538,731, and 09/559,177.

The use of microprism sheets having light diffusing properties is of course well-known for purposes such as glare reduction overlays, rear or front projection screens, or light-diffusion screens of the type interposed between the back of a liquid crystal diode (LCD) screen and a light source. Examples of prior microprism arrangements involving light diffusion are disclosed, for example, in U.S. Pat. No. 3,718,078 (Plummer), U.S. Pat. No. 3,902,787 (Sherlock), U.S. Pat. No. 4,309,073 (Nishimura et al.), and U.S. Pat. No. 5,837,346 (Langille et al.).

In general, however, in contrast to the present invention, the microprism sheet arrangements disclosed in these references use the diffusion properties to smooth out irregularities or hot spots with respect to light or images that are spread out over a relatively large area, as opposed to providing more uniform transmission of light sources intentionally combined together to provide a large display or light source.

Additional examples of microprism sheets which may be provided with light diffusing properties are disclosed in copending U.S. patent application Ser. No. 09/481,942, filed Jan. 13, 2000, which discloses a number of microprism sheet treatment arrangements, in the context of privacy screens, interlacing arrangements and light separating arrangements, but not specifically for use in lighting elements.

One prior lighting arrangement involving use of microprism sheets in connection with "point sources" such as LEDs is disclosed in U.S. Pat. No. 5,835,661 (Tai et al.). However, the system disclosed in this patent seeks "the conversion of light from a point-like light source to a linear or planar light beam having a sufficiently uniform distribution of light" by employing a light pipe combined with microprism structures which are used to divert light out of the light pipe over an extended surface. The lighting arrangement disclosed in U.S. Pat. No. 5,835,661 is said to be useable in displays, road signs, medical research equipment, instrument meters or jewelry, light pictures or art work, or for surgical or dental lighting, but nevertheless is disadvantageous because of its relative complexity and because the lighting elements disclosed in the patent is are limited to rigid rather than flexible structures. The present invention is intended to be suitable for use not only in the applications listed in U.S. Pat. No. 5,835,661, but also in a variety of additional lighting applications requiring more flexible, low power, wide area lighting.

Finally, those skilled in the art will note that the use of diffusive agents such as microprism sheets to diffuse light emitted by the LEDs permits the light to be combined in a more uniform manner than is possible with conventional diffusers, which do not have the selective light bending properties of a microprism sheet. On the other hand, however, it is also within the scope of the present invention to use a conventional diffuser in connection with the lighting elements since the prior art does not show use of multiple discrete lighting elements and a diffuser as a video monitor, light bulb, or light tube, regardless of the type of diffuser.

SUMMARY OF THE INVENTION

It is accordingly a first objective of the invention to provide new applications for the lighting elements described in U.S. patent application Ser. No. 09/592,913, which possess the advantages of reduced power consumption and heat output, and which are lightweight, durable, and flexible.

It is a second objective of the invention to provide a video monitor or display, and in particular a color video monitor or display having the advantages of reduced power consumption and heat output, and which is lightweight, durable, and flexible.

It is a third objective of the invention to provide a light bulb having reduced power consumption and heat bulb, which can display multiple colors, and which is lightweight and durable.

It is a fourth objective of the invention to provide a neon lighting element replacement capable of displaying multiple colors, and yet that has a low power consumption and heat output, and that is lightweight, durable, and flexible.

It is a fifth objective of the present invention to provide combinations of lighting elements of the type described in U.S. patent application Ser. No. 09/592,913, in order to provide increased diversity of lighting effects, including large area light panels or tiles.

It is a sixth objective of the invention to provide lighting elements of the type described in U.S. patent application Ser. No. 09/592,913, which is made up of a plurality of point sources, and yet which provides an even, wide area lighting effect similar to that provided by a fluorescent lamp with a simplified construction.

These objectives are achieved, in accordance with the principles of a preferred embodiment of the invention, by providing a lighting element in which the plurality of point sources are in the form of LEDs situated between a diffuser and a backing structure to form a flexible light emitting sheet or tube.

According to a first preferred embodiment of the invention, the LEDs are arranged to form pixels of a video monitor, and in particular of a color video monitor. Color is achieved by arranging red, green, and blue LEDs (or similar complementary color combinations of LEDs) to form color pixels that can be controlled by selectively illuminating LEDs of appropriate color according to input RGB or similar format signals.

In this embodiment of the invention, the LEDs and reflector can be arranged to form a honeycomb pattern of individual hexagonal elements, while a microprism sheet or similar light bending structure is used to depixelize the image, i.e., to make individual pixels less visible, as well as to expand the viewing angle, if desired, and/or to provide privacy screening or stereoscopic effects, as described in U.S. patent application Ser. Nos. 09/481,942, 09/538,731, and 09/559,177. To obtain stereoscopic effects, for example, the individual pixels of the honeycomb arrangement may be arranged such that light from individual pixels is oppositely polarized. When the displayed image is a combination of stereoscopic right and left eye images, a three dimensional image will appear when the display screen is viewed through oppositely polarized lenses.

In a second preferred embodiment of the invention, a flat lighting element of the above type is housed in a bulb-shape housing to emulate a light bulb. The LEDs may all be one color or again be arranged to provide color effects, by arranging the different colored LEDs in concentric rings, for example, with appropriate connections to a control circuit capable of separately activating LEDs of different colors.

According to a third preferred embodiment of the invention, a lighting element of the type in which multiple LEDs are surrounded by a diffuser is arranged as a cylinder and connected so as to provide multi-color effects by activating different groups of LEDs.

Finally, according to a fourth preferred embodiment of the invention, lighting elements of the type described in U.S. Pat. No. 09/592,913 and illustrated in FIGS. 1–3 herein may be further combined or sandwiched between a reflector (not shown) and a diffuser to form large area light panels or tiles.

As indicated above, in addition to providing new applications, the present application permits the use of diffusers other than microprism sheets, with appropriately shaped reflectors or no reflectors at all, and/or the use of flat reflectors with appropriately shaped microprism sheets.

For example, in the case of the third preferred embodiment of the invention in which the LEDs are arranged in a cylindrical housing, the diffuser may be in the form of a diffusive gas or gel, while in all of the embodiments of the invention, the microprism sheet may be replaced by conventional diffuser sheets, lenticular arrangements, reflective diffusers, modified microprism sheets arranged to provide privacy screening or stereoscopic effects, and so forth.

In the case of microprism sheets, it will be appreciated by those skilled in the art that the manner in which the microprism sheets used in the preferred embodiments of the invention are treated to obtain diffusion properties may be varied in numerous ways without departing from the scope of the invention, including the use of diffusion coatings, roughening or etching of surfaces of the microprism, and casting of materials with diffusion agents added to the material before solidification.

DETAILED DESCRIPTION OF THE PREFERRED EMBODIMENTS

Figure 1:
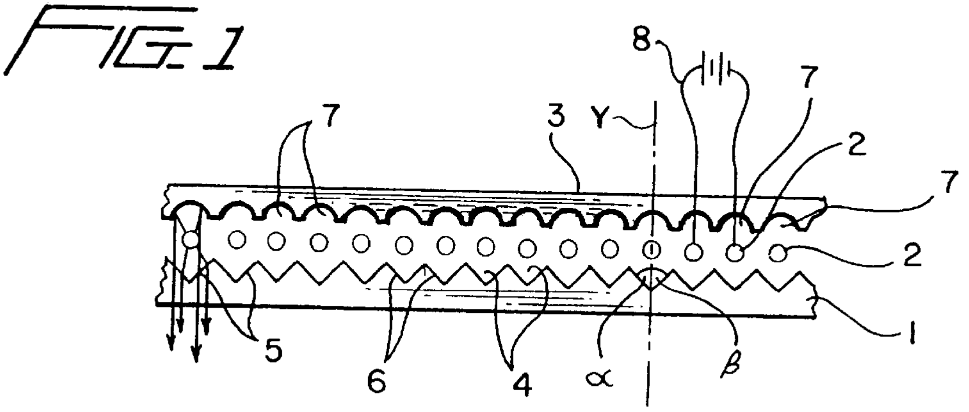
FIG. 1 is a side view of a lighting element which may be used in connection with the preferred embodiments of the invention.

FIG. 1 shows a lighting element made up of multiple LEDs, a diffusive agent, and a reflector as described in U.S. patent application Ser. No. 09/592,913, which is suitable for use in connection with the various devices disclosed in the present invention. Although this lighting element is described in detail herein, it is to be understood that the devices described herein may be used with modifications of the illustrated lighting element, and in particular, as described in more detail below in connection with FIGS. 7 and 8, with lighting elements that substitute a diffusive agent such as a liquid, gas, or gel for the microprism sheet, add a diffusive agent to the microprism sheet, or modify the microprism sheet to exhibit additional effects such as privacy screening or stereoscopic effects. In addition, the devices of the preferred embodiments may be used with lighting elements that modify the reflector structure to be planar or to have shapes other than the illustrated shapes, or that combine the diffusive and reflective structures.

By way of example, the principal components of the lighting element of FIG. 1 are a microprism sheet 1, a plurality of small point-like light sources such as LEDs 2 arranged to fit within grooves of the microprism sheet, and a reflective backing structure 3. The microprism sheet 1 is preferably of the type having v-shaped linear grooves 4 defined by surfaces 5 and 6 extending at respective angles $\alpha$ and $\beta$ relative to an axis Y transverse to the principal plane of sheet 1. For purposes of the present invention, angles $\alpha$ and $\beta$ may be equal, although it is possible that, for some purposes, different angles may be desired to create a preferred viewing angle.

Microprism sheet 1 maybe of conventional construction and materials, so long as it has optical properties that reduce the visibility of the individual point sources and provide a more uniform lighting effect. Modification of surfaces 5 and 6 to achieve light diffusion can be carried out by any of the methods described in the prior patents or patent applications cited above, including coating the surfaces with a light diffusing material and casting irregularities into the surfaces, or modifying the surfaces by delustering, and/or chemical or laser etching. In the case of chemical or laser etching, surfaces may be caused to diffuse light by roughening, either by applying the chemical or directing the laser at the surface through an appropriate mask, or by etching the casting tool or die that forms the sheet. In addition, or alternatively, surfaces could originally cast a light diffusing finish, or a light diffusing compound could be dispersed into the material of the microprism sheet.

The pitch of the grooves will depend on the particular application, and in particular on the size of the LEDs to be situated therein. Typical acrylic microprism sheets can be cast with parallel grooves having a pitch of on the order of 0.1 to 0.25 inches, which is suitable for placement of LEDs therein. Depending on the depth of the LED placement relative to the front of the sheet, suitable angles can be chosen from anywhere from less than 30° to more than 60°.

Figure 2A:
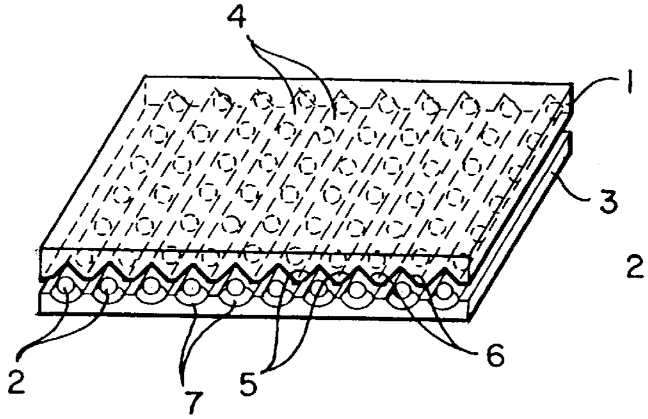
FIG. 2A is an isometric view of a parallel groove configuration for the lighting element illustrated in FIG. 1.
Figure 7:
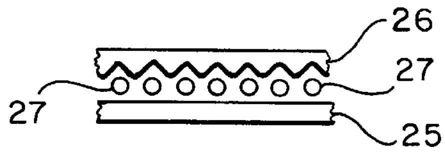
FIG. 7 is a side view of a variation of the lighting element of FIGS. 1 and 2 which the reflector has a flat shape.
Figure 8:
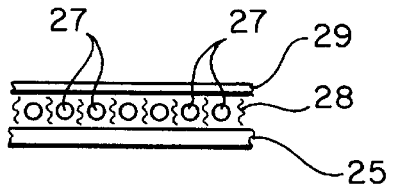
FIG. 8 is a side view of a variation of the lighting element of FIGS. 1 and 2 in which the microprism sheet is replaced by a diffusive agent.

Preferably, positioned behind the LEDs is a reflective structure arranged to reflect light back through the microprism sheet. The reflective structure (i) may be planar, as illustrated in FIGS. 7 and 8, (ii) include grooves 7 as illustrated in FIGS. 1 and 2A, (iii) may be formed with parabolic indentations, or (iv) may be otherwise shaped to reflect light back to the microprism sheet at an optimal angle. The reflective structure may be a coated resin sheet, a stamped and formed foil structure, or any other structure having a reflective surface which can be adhered to the microprism sheet.

The LEDs may be sandwiched between the microprism sheet and the reflective structure, adhered to the appropriate surfaces of the microprism sheet or reflective structure, and the LEDs and lead wires 8 for the LEDs (schematically shown in FIG. 1) optionally encapsulated. In case the LEDs are encapsulated in the grooves, the material encapsulating the LEDs may itself be shaped, polished, and/or coated to form the reflective structure. Alternatively, the LEDs may be mounted on a transparent flexible printed circuit board positioned between the microprism sheet and the reflective structure.

Figure 2B:
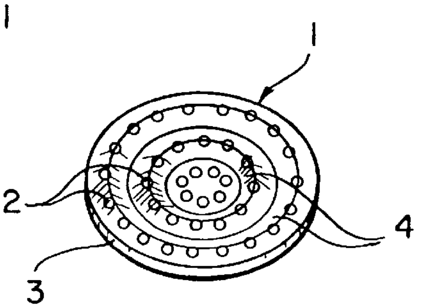
FIG. 2B is an isometric view of an alternative concentric groove configuration for the lighting element illustrated in FIG. 1.

As shown in FIG. 2A, the v-shaped grooves may be arranged in a linear and parallel configuration, although those skilled in the art will recognize that it is also possible to provide a lighting element having grooves are arranged in concentric circles in the manner of a Fresnel lens, as shown in FIG. 2B, or in any other desired pattern.

Figure 3:
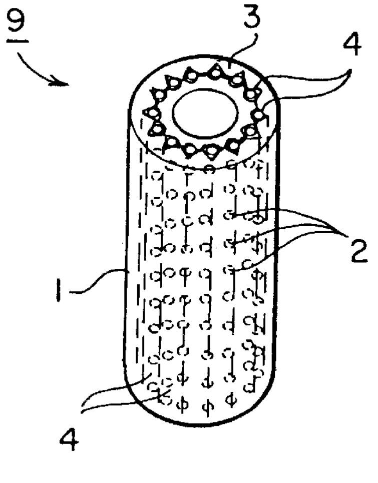
FIG. 3 is an isometric view of the lighting element of FIGS. 1 and 2A, which has been wrapped to form a tubular lighting element.

As illustrated in FIG. 3, the lighting element illustrated in FIGS. 1 and 2 may be arranged into a variety of configurations, including a tubular lighting element 9 that resembles a fluorescent light but has the advantages of simple control and low power consumption.

Figure 4A:
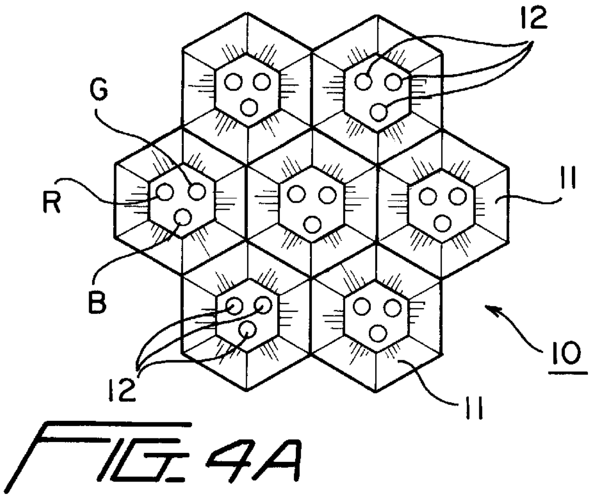
FIG. 4A is a plan view of a pixellated reflector structure for color video monitor constructed in accordance with the principles of a preferred embodiment of the invention.
Figure 4B:
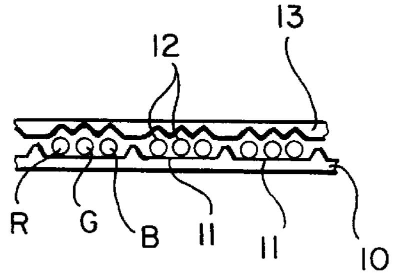
FIG. 4B is a side view of the color video monitor of the embodiment illustrated in FIG. 4A.

Alternatively, as illustrated in FIGS. 4A and 4B, the lighting element of the invention may be modified to form a display screen of a video monitor. This is accomplished by pixellating the LEDs, i.e., by arranging the LEDs in an array or matrix consisting, by way of example, of hexagonal or honeycomb-shaped cells, and by connecting the LEDs so that they can be individually activated in response to an video signal input. In the embodiment illustrated in FIGS. 4A and 4B, pixellation is facilitated by arranging the reflector 10 to form hexagonal or honeycomb cells 11 in which are situated individual LEDs 12 or groups of LEDs, which are then sandwiched by a diffusion sheet 13, which may be a microprism sheet, a lenticular lens array, or similar optical device, including stereoscopic and privacy screening arrangements of the type described in copending U.S. patent application Ser. Nos. 09/481,942, 09/538,731, and 09/559, 177.

Although monochrome pixels made up of a single monochrome LED may be used, the video arrangement of this preferred embodiment of the invention is especially suited for adaptation to provide a color display, by utilizing LEDs that display multiple colors, or by arranging the LEDs in groups of three, each group including a red LED, a blue LED, and a green LED (or similar three-color arrangement) connected to red, green, and blue (RGB) video inputs.

Furthermore, this embodiment is especially suitable for providing stereoscopic effects since the individual pixels, or groups of pixels, can easily be arranged by those skill in the art to including polarizing elements that oppositely polarize light from the LEDs in order to permit separation of the light into left and right eye images when viewed through corresponding lenses. When the separated light corresponds to source images taken, respectively, from the perspective of the left and right eyes, a three dimensional effect will result.

Figure 5:
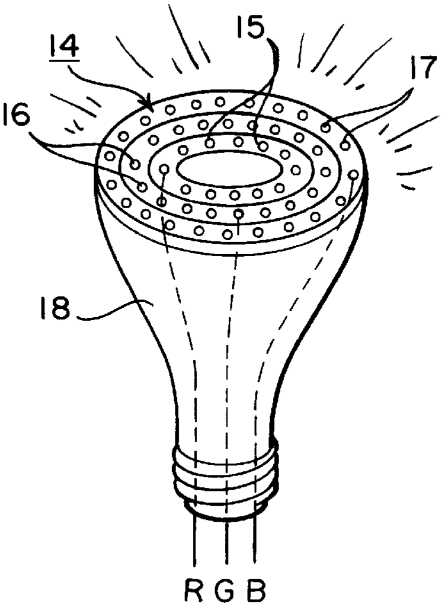
FIG. 5 is an isometric view of a light bulb constructed in accordance with the principles of a second preferred embodiment of the present invention.

In the embodiment illustrated in FIG. 5, a lighting element 14 corresponding to the lighting element illustrated in FIG. 2B, including a plurality of LEDs 15, 16, 17, is adapted to fit into a housing 18 resembling the housing of a standard light bulb. The LEDs 15, 16, 17 may all be the same color or may be differently colored and connected to different circuits to provide controllable color lighting effects.

Figure 6:
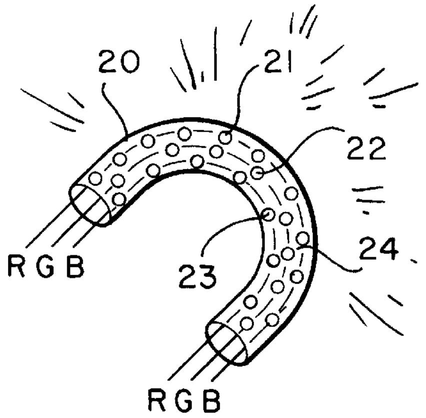
FIG. 6 is an isometric view of a flexible light tube constructed in accordance the principles of a third preferred embodiment of the invention.

The embodiment illustrated in FIG. 6 is a flexible tube having a light output that can be made to resemble that of a neon light, and that may be employed as a neon light tube replacement, but with lower power consumption and greater versatility. The tube of this embodiment of the invention includes a flexible cylindrical housing 20 which encloses a plurally of LEDs 21, 22, 23. The LEDs 21, 22, 23 are surrounded by a diffusing agent 24 sealed within the housing 20. The diffusing agent may be a liquid, gas, or gel, or if flexibility is not required, a more rigid solid diffusing agent.

Again, in this embodiment of the invention, the LEDs 21, 22, 23 may be monochrome or may be multi-colored and connected to separate control circuits or switches for separately controlling the different colors to provide a variety of lighting effects.

Figure 9:
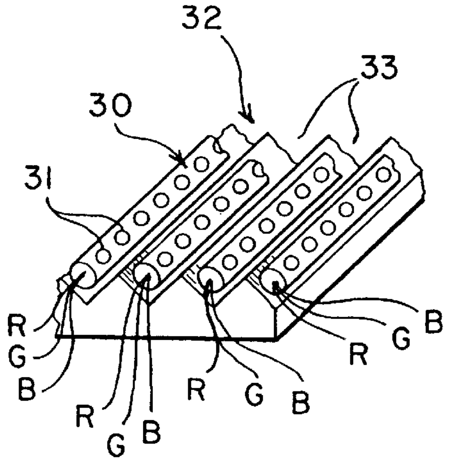
FIG. 9 is a side view of a variation of the lighting element of FIGS. 1 and 2, in which the lighting element is sandwiched between a large area reflector and a diffuser.

According to the embodiment illustrated in FIG. 9, lighting elements of the type illustrated in FIGS. 1–3, and especially the tube 30 constructed in the same manner as the lighting element of FIG. 3, including multiple LEDs 31, may be further positioned or sandwiched between a reflector (not shown) and a diffuser, illustrated as a microprism sheet 32 having grooves 33, to form a large area light panel or tile, offering the possibility of creating environmental lighting, multiple colored light tile displays, and so forth.

As mentioned above, the reflector used in the lighting element of FIGS. 1–3 may be replaced by a planar reflector 25, as illustrated in FIG. 7, which also shows a microprism sheet 26 and LEDs 27. Although the use of a flat reflector may result in reduced light output, the reduced cost of such an arrangement might justify the lower efficiency. On the other hand, as illustrated in FIG. 8, as also mentioned above, the microprism sheet itself may be replaced by a diffusive agent 28 in the form of a liquid, gas, or gel, and a flexible at least partially transparent front sheet 29 arranged to contain the diffusive agent.

Having thus described preferred embodiments of the invention in sufficient detail to enable those skilled in the art to make and use the invention, it will nevertheless be appreciated that numerous variations and modifications of the illustrated embodiment may be made without departing from the spirit of the invention. Accordingly, it is intended that the invention not be limited by the above description or accompanying drawings, but that it be defined solely in accordance with the appended claims.

What is claimed is:

1. A lighting element, comprising:

a reflector;

a diffusive agent;

a plurality of small discrete light sources arranged in a plurality of rows, each row including a plurality of said small discrete light sources, wherein each of said small discrete light sources is positioned between the reflector and the diffusive agent, said diffusive agent being arranged to diffuse light from said small discrete light sources in order to provide a uniform, wide area lighting effect.

2. A lighting element as claimed in claim 1, wherein the small discrete light sources are light emitting diodes.

3. A lighting element as claimed in claim 2, wherein the diffusive agent is a microprism sheet.

4. A lighting element as claimed in claim 3, wherein said light emitting diodes have different colors.

5. A lighting element as claimed in claim 4, wherein said light emitting diodes are arranged as pixels and connected to a video color input to form a video display screen.

6. A lighting element as claimed in claim 2, wherein said diffusive agent is a diffusive agent selected form the group consisting of a liquid, a gas, and a gel.

7. A lighting element as claimed in claim 2, wherein said light emitting diodes are arranged as pixels and connected to a video input.

8. A lighting element as claimed in claim 7, wherein said light emitting diodes have different colors and are connected to a video color input to form a video display screen.

9. A lighting element as claimed in claim 2, wherein said lighting element is positioned in a housing resembling a housing of a light bulb.

10. A lighting element as claimed in claim 1, wherein said lighting element is positioned in a housing resembling a housing of a light bulb.

11. A lighting element as claimed in claim 1, wherein said lighting element is formed into one of a plurality of tubes, and said plurality of tubes are positioned with a second diffuser to form a large area light panel or tile.

12. A lighting element as claimed in claim 11, wherein said second diffuser is a microprism sheet.

* * * * *